United States Patent [19]

Fisher

[11] 4,110,885
[45] Sep. 5, 1978

[54] ENCAPSULATING BLOCK AND REMOVAL APPARATUS

[75] Inventor: William Frederick Fisher, Peterborough, Canada

[73] Assignee: Fisher Gauge Limited, Peterborough, Calif.X

[21] Appl. No.: 800,724

[22] Filed: May 26, 1977

[51] Int. Cl.² .............................................. B23P 19/00
[52] U.S. Cl. ........................................ 29/239; 29/244; 29/427; 225/97; 225/103; 269/7
[58] Field of Search ................. 29/427, 426, 424, 423, 29/239, 244; 225/97, 103, 104; 269/7

[56] References Cited

U.S. PATENT DOCUMENTS

| | | | |
|---|---|---|---|
| 3,067,498 | 12/1962 | Tomka | 225/104 X |
| 3,579,784 | 5/1971 | Klempner | 225/103 X |
| 3,672,032 | 6/1972 | Witherspoon | 269/7 X |
| 4,005,635 | 2/1977 | Feldcamp | 269/7 X |

*Primary Examiner*—Frank T. Yost

[57] ABSTRACT

An encapsulating block encasing a projecting workpiece, the block having a plurality of parallel slots in opposed side walls, the slots in each side wall extending alternately from opposed side edges of the side wall and terminating in a bearing face in the region of a plane passing through the workpiece and a frangible cross-sectional area of the block. Apparatus for use with the block consists of a pair of dies each having a plurality of parallel projecting tines receivable longitudinally in the slots to meet the bearing faces whereby on moving the dies together the block will fracture in the frangible cross-sectional area.

5 Claims, 5 Drawing Figures

ENCAPSULATING BLOCK AND REMOVAL APPARATUS

This invention relates to the removal of blocks from workpieces such as turbine and compressor blades which have been encapsulated for machining.

After a turbine or a compressor blade has been cast or forged at least one end portion must be ground or broached. To align the blade precisely for machining it is encapsulated in a block or casing of metal, preferably a tin-lead-antimony alloy. The blade may be entirely encapsulated for broaching or it may have at least one end of the blade protuding from the block. The block is then clamped in a broaching, grinding or milling machine and the end of the blade is worked. An apparatus used for encapsulating workpieces is disclosed in U.S. Pat. No. 3,701,377 issued Oct. 31, 1972 in the name of William F. Fisher assignor to Fisher Gauge Limited. When the end portion has been machined the block is melted from the blade. Because of the temperature which must be used to melt the block, some of the metal from the block sometimes adheres to the blade. Any adhering particles must be removed because any foreign matter remaining on the blade may cause the blade to deteriorate. Positive removal of all traces of foreign matter is difficult and costly.

It is an object of the present invention to provide an encapsulating block which is frangible to remove the workpiece.

Another object of the invention is to provide an apparatus to remove an encapsulating block from a workpiece.

Another problem of encapsulation is the shrinkage of the block on cooling. Although lateral shrinkage increases the grip of the block on the workpiece the axial shrinkage leaves an additional amount of the protuding end of the workpiece exposed which reduces the support of the workpiece for machining.

It is another object of the invention to provide an encapsulating block which has decreased axial shrinkage on the workpiece.

Essentially the invention consists of an encapsulating block encasing a workpiece, comprising the block having a plurality of parallel slots in opposed side walls thereof, the slots defining ribs therebetween, the slots in each side wall extending alternately from opposed edges of said side wall, each slot terminating in a bearing face defining the end of a rib and in the region of a plane cross-sectional area passing through the workpiece and a frangible cross-sectional area of the block.

The invention also resides in apparatus for use with an encapsulating block encasing a workpiece, the block having parallel slots in opposed side walls thereof extending alternately from opposed edges of each side wall to terminate in a bearing face in the region of a plane passing through the workpiece and a frangible cross-sectional area of the block, comprising: a pair of dies; a plurality of parallel tines projecting in one direction from each die, the tines being meshable and arranged to be received in the slots of the block to bear against said faces; whereby on moving the dies towards one another the block will fracture in said cross-sectional area.

An example embodiment of the invention is shown in the accompanying drawings in which.

Figure 1:
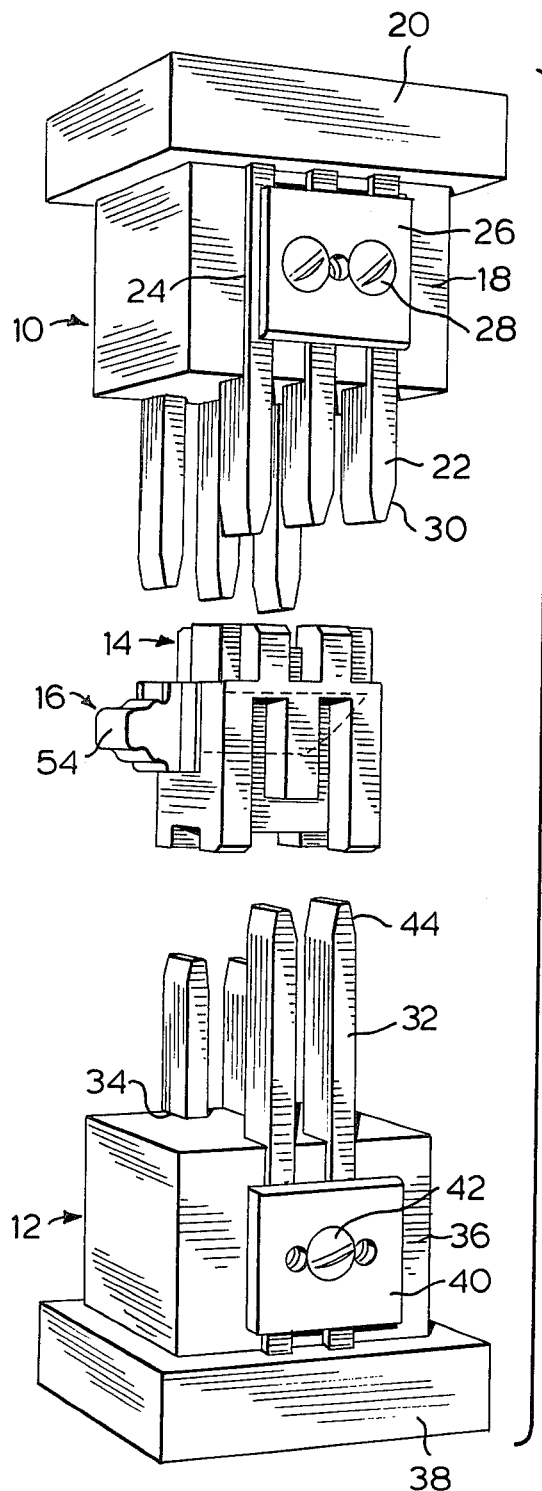
FIG. 1 is an exploded perspective view of an encapsulation block and apparatus for fracturing the encapsulation to remove a workpiece embedded in the block.
Figure 2:
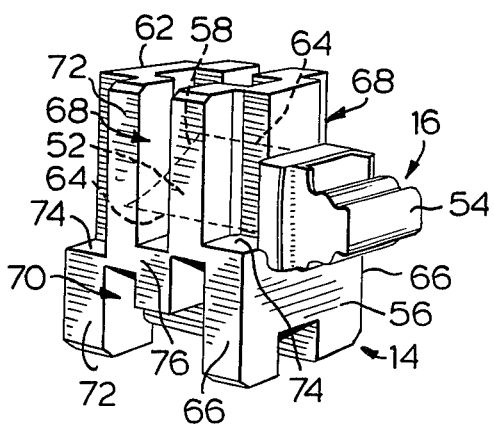
FIG. 2 is another perspective view of the block of FIG. 1.

The example embodiment comprises a pair of meshable dies, denoted as upper die 10 and lower die 12, which act against a block 14 encapsulating a workpiece 16.

Upper die 10 consists of a rectangular member 18 having a bearing cap 20. A plurality of tines 22, positioned laterally in recesses 24 in member 18, are located in rows on opposite sides of the member, each row being held in the recesses by clamping plates 26 removably fixed to the member by screws 28. Tines 22 project downwardly from member 18 and are preferably tapered and flattened at their free ends 30. The construction of lower die 12 is the same as that of upper die 10 with a plurality of tines 32 located laterally in recesses 32 on opposite sides of a member 36 having a bearing cap 38, the tines being held in recesses 34 by clamping plates 40 removably fixed to the member by screws 42 and being tapered and flattened at their upper free ends 44. The ends of tines 22 and 32 abut bearing caps 20 and 38 respectively.

Block 14 encases workpiece 16 which is shown in the example embodiment as a blade 52 having an end piece 54 in the form of a "fir tree." Block 14 encases blade 52 with end piece 54 projecting from one end wall 56 of the block for grinding. The end 58 of blade 52 opposite end piece 54 is flush with the bottom of a recess 60 in the other end wall 62 of block 14, and side edges 64 of the blade lie adjacent opposed side walls 66 of the block. A plurality of parallel vertical slots 68 are located in the two opposed side walls 66 of block 14 to receive tines 22 of upper die 10. A further plurality of parallel vertical slots 70, spaced both longitudinally and laterally from slots 68, are located in the same two opposed walls of the mold to receive tines 32 of lower die 12. Slots 68 and 70 are staggered in the pattern of meshable tines 22 and 32 and they terminate in or adjacent a plane taken through edges 64 of encapsulated blade 52. Separating slots 68 or slots 70 are ribs 72 which terminate in bearing faces 74 to receive in abutment the free ends 30 and 44 of tines 22 and 32. Preferably each bearing face 74 is spaced from the plane taken through edges 64 of blade 52 to leave a narrow bridge 76 diagonally between opposed ribs 72. Each tine 22 is long enough that when those tines are received in slots 68 the ends 30 of the tines will bear against faces 74 of those slots. Similarly the length of each tine 32 is such that when those tines are received in slots 70 the ends 44 of the tines will bear against faces 74 of those slots. When tines 22 and 32 are bearing against faces 74 of slots 68 and 70, bearing caps 20 and 32 are preferably parallel and normal to the tines.

Figure 3:
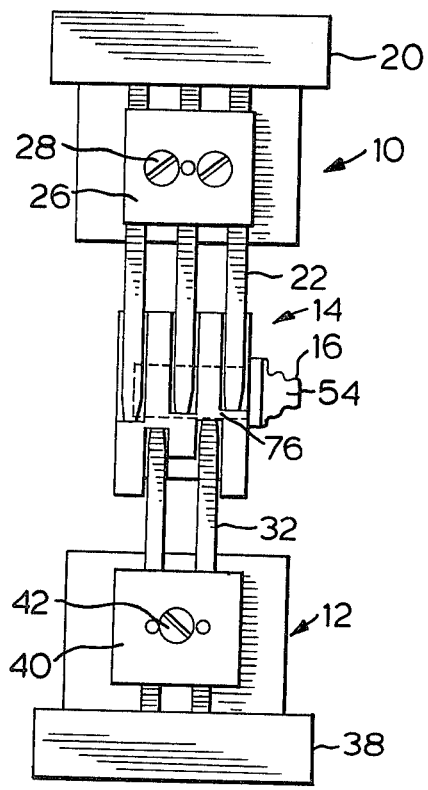
FIG. 3 is a side elevational view similar to FIG. 1 showing the device engaging the block.

In the operation of the example embodiment block 14 is placed on lower die 12 with tines 32 received longitudinally in slots 70 and bearing against end walls 74 of ribs 72. Upper die 10 is then lowered to have tines 22 received longitudinally in slots 68 of block 14 until the tines bear against end walls 74 of ribs 72, as seen in FIG. 3.

Figure 4:
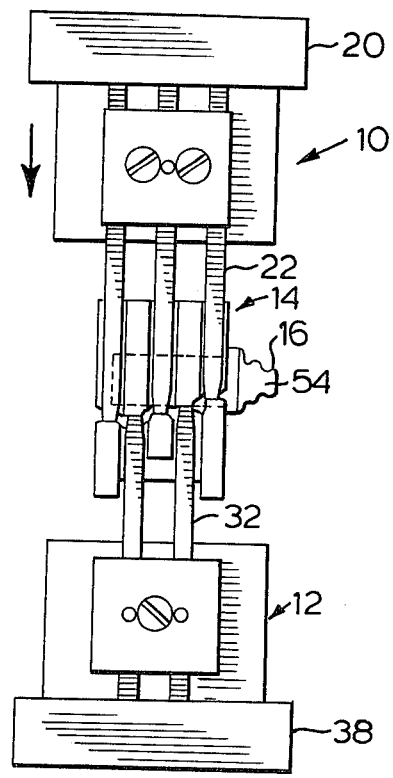
FIG. 4 is a view similar to FIG. 3 showing the apparatus moved to fracture the block.
Figure 5:
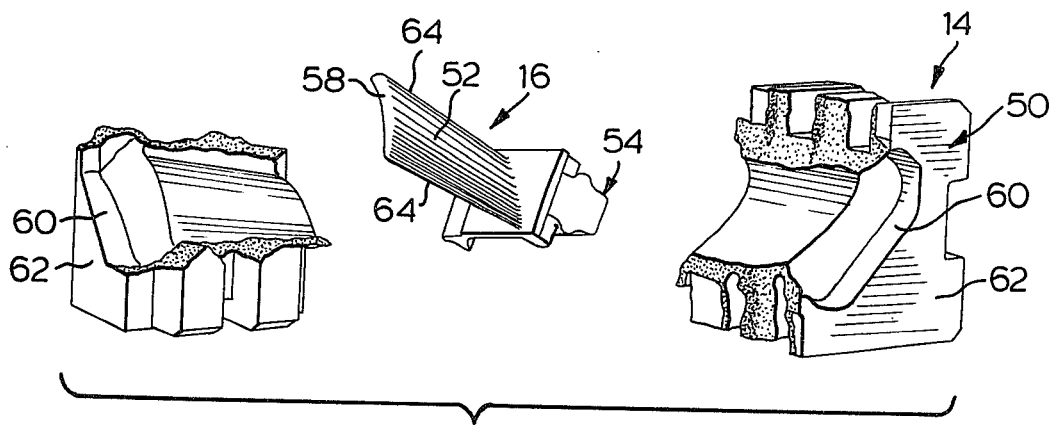
FIG. 5 is an exploded perspective view of the portions of the fractured block removed from the workpiece.

Dies 10 and 12 are moved further towards one another to fracture block 14. This may be done using a press or a striking tool. Under pressure from tines 22 and 32 acting in opposite directions, block 14 will fracture across bridges 76 between opposed ribs 72 on each side wall 66 and across the side wall adjacent side edges 64 of blade 52 of the workpiece, as seen in FIG. 4, being the weakest cross-sectional area on each side of block 50. Upon fracturing block 14, workpiece 16 is retrievable when the two portions of the fractured block are separated as seen in FIG. 5.

It will be appreciated that a workpiece of any suitable shape may be removed from an encapsulation mode in this manner. Block 14 is designed to have a cross-sectional area of side walls 66 of the block on each side of the workpiece 16 thin enough to be fractured, with slots 68 and 70 located accordingly, assuming of course that the shape of the workpiece is such that a fracture in that cross-sectional area will allow the workpiece to be removed when the two fractured portions of the block are separated.

Any suitable number of tines 22 and 32 in dies 10 and 12 may be used, with corresponding slots 68 and 70 in block 14, and the tines may be changed by removing clamping plates 26 and 40. While the example embodiment shows a block 14 consisting of a rectangular block 50 and parallel sets of tines 22 or 32 in each die 10 or 12, the block and the tines may be otherwise configured to achieve the result for a workpiece of a given shape. Also, while dies 10 and 12 are shown vertically oriented they may move on any axis.

Slots 68 and 70 may be of any suitable shape to receive tines 22 and 32 and to provide end walls 74. While bridges 76 may be eliminated by lengthening slots 68 and 70 to meet one another, this will weaken side walls 66 which may not be suitable where higher clamping pressures are applied to block 14 for machining workpiece 16.

It will be appreciated that axial shrinkage of block 14, i.e., shrinkage between end walls 56 and 62 when the block is cooled after its formation by injection, will be reduced because of the presence of slots 68 and 70.

I claim:

1. An encapsulating block encasing a workpiece, the block having a plurality of parallel slots in opposed side walls thereof, the slots defining ribs therebetween, the slots in each side wall extending alternately from opposed edges of said side wall, each slot terminating in a bearing face defining the end of a rib and in the region of a plane cross-sectional area passing through the work piece and a frangible cross-sectional area of the block.

2. A block as claimed in claim 1 in which the slots extending from one end of the block are substantially the same width as the ribs between the slots extending from the other end of the block.

3. Apparatus for use with an encapsulating block encasing a workpiece, the block having parallel slots in opposed side walls thereof extending alternately from opposed edges of each side wall to terminate in a bearing face in the region of a plane passing through the workpiece and a frangible cross-sectional area of the block, comprising:

a pair of dies;

a plurality of parallel tines projecting in one direction from each die, the tines being meshable and arranged to be received in the slots of the block to bear against said faces;

whereby on moving the dies towards one another the block will fracture in said cross-sectional area.

4. Apparatus as claimed in claim 3 in which the tines are removably fixed on each die.

5. Apparatus as claimed in claim 3 in which each die carries a bearing cap, the tines bearing longitudinal against the cap opposite their projecting ends.

* * * * *